US012789300B2

(12) United States Patent
Blumanstock

(10) Patent No.: US 12,789,300 B2
(45) Date of Patent: Nov. 10, 2026

(54) REPAIR OF AIRCRAFT FAN BLADE

(71) Applicant: Chromalloy Gas Turbine LLC, Palm Beach Gardens, FL (US)

(72) Inventor: Benny L Blumanstock, Stuart, FL (US)

(73) Assignee: Chromalloy Gas Turbine LLC, Palm Beach Gardens, FL (US)

(*) Notice: Subject to any disclaimer, the term of this patent is extended or adjusted under 35 U.S.C. 154(b) by 667 days.

(21) Appl. No.: 18/446,923

(22) Filed: Aug. 9, 2023

(65) Prior Publication Data

US 2023/0405736 A1 Dec. 21, 2023

Related U.S. Application Data

(63) Continuation of application No. 18/156,466, filed on Jan. 19, 2023.

(60) Provisional application No. 63/366,707, filed on Jun. 21, 2022.

(51) Int. Cl.

| | |
|---|---|
| ***B23K 9/16*** | (2006.01) |
| ***B23K 9/00*** | (2006.01) |
| ***B23K 9/095*** | (2006.01) |
| ***B23K 15/00*** | (2006.01) |
| ***B23K 37/003*** | (2025.01) |
| *B23K 101/00* | (2006.01) |

(52) U.S. Cl.

CPC .......... *B23K 37/003* (2013.01); *B23K 9/0026* (2013.01); *B23K 9/0956* (2013.01); *B23K 9/16* (2013.01); *B23K 15/00* (2013.01); *B23K 2101/001* (2018.08)

(58) Field of Classification Search

CPC ........ B23K 9/0956; B23K 9/16; B23K 15/00; B23K 2101/001; B23K 9/0026; B23K 37/003; F01D 9/02

See application file for complete search history.

(56) References Cited

U.S. PATENT DOCUMENTS

| | | | | |
|---|---|---|---|---|
| 4,832,252 A * | 5/1989 | Fraser | B23P 6/005 | 228/232 |
| 5,813,832 A * | 9/1998 | Rasch | F01D 5/005 | 415/200 |
| 6,326,585 B1 * | 12/2001 | Aleshin | B23K 26/032 | 219/121.84 |

(Continued)

FOREIGN PATENT DOCUMENTS

| | | |
|---|---|---|
| CN | 102639287 A | 8/2012 |
| CN | 113498450 A | 10/2021 |

OTHER PUBLICATIONS

First Office Action received in Chinese Application No. 202310575732.2, 10 pages, dated Sep. 18, 2025.

*Primary Examiner* — Rodolphe Andre Chabreyrie
(74) *Attorney, Agent, or Firm* — AVEK IP, LLC

(57) ABSTRACT

A method is provided for repairing a hollow fan blade that includes a first portion and a second portion secured together by a joint. An interior cavity of the hollow fan blade is under a vacuum. The method includes obtaining a replacement portion having a unitary construction, removing a portion from a cutback region of the hollow fan blade to form a weld foundation, and welding the replacement portion to the weld foundation. The welding is at a temperature at the joint that does not exceed a distortion temperature of the joint.

20 Claims, 19 Drawing Sheets

(56) References Cited

U.S. PATENT DOCUMENTS

| | | | | |
|---|---|---|---|---|
| 6,568,077 | B1 * | 5/2003 | Hellemann | B23P 6/005 228/19 |
| 2004/0151585 | A1 * | 8/2004 | Jones | F04D 29/324 416/227 R |
| 2005/0173496 | A1 | 8/2005 | Sato et al. | |
| 2013/0312249 | A1 | 11/2013 | Buchal et al. | |
| 2016/0115820 | A1 * | 4/2016 | Prentice | F01D 25/005 415/200 |
| 2020/0238415 | A1 * | 7/2020 | Cui | B23P 6/007 |
| 2021/0023661 | A1 | 1/2021 | Panero | |
| 2022/0145765 | A1 | 5/2022 | Navale et al. | |
| 2023/0405735 | A1 | 12/2023 | Blumanstock | |
| 2023/0405736 | A1 | 12/2023 | Blumanstock | |

* cited by examiner

REPAIR OF AIRCRAFT FAN BLADE

RELATED APPLICATIONS

This application is a continuation-in-part of U.S. patent application Ser. No. 18/156,466 filed Jan. 19, 2023, which claims priority to U.S. Provisional Application No. 63/366,707, filed Jun. 21, 2022. The disclosure of each of these applications is incorporated herein by reference in its entirety.

FIELD OF THE DISCLOSURE

The disclosure relates generally to repair of aircraft fan blades. More specifically, the disclosure relates to repairing hollow fan blades of aircraft.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

One innovative aspect of the subject matter described in this disclosure can be implemented as a method of repairing a hollow fan blade that includes a first portion and a second portion secured together by a joint. An interior cavity of the hollow fan blade is under a vacuum. The method includes obtaining a replacement portion having a unitary construction, removing a portion from a cutback region of the hollow fan blade to form a weld foundation, and welding the replacement portion to the weld foundation. The welding is at a temperature at the joint that does not exceed a distortion temperature of the joint.

In an aspect, according to any one of the preceding aspects, welding the replacement portion to the weld foundation includes first welding the replacement portion to the weld foundation using a first welding technique and subsequently operably welding the replacement portion to the weld foundation using a second welding technique.

In an aspect, according to any one of the preceding aspects, the first welding technique includes tungsten inert gas (TIG) welding.

In an aspect, according to any one of the preceding aspects, the second welding technique includes electron beam welding.

In an aspect, according to any one of the preceding aspects, a width of the replacement portion is greater than a width of the weld foundation.

In an aspect, according to any one of the preceding aspects, the method includes arranging a thermocouple on at least one of the first portion and the second portion.

In an aspect, according to any one of the preceding aspects, the method includes monitoring a temperature of at least a portion of the hollow fan blade during the welding.

In an aspect, according to any one of the preceding aspects, the method includes securing the hollow fan blade within a purge box prior to the welding.

In an aspect, according to any one of the preceding aspects, welding the replacement portion includes situating the hollow fan blade in a vacuum chamber.

In an aspect, according to any one of the preceding aspects, a length of the replacement portion is at least 20% of a length of a leading edge of the hollow fan blade.

In an aspect, according to any one of the preceding aspects, the interior cavity further includes a honeycomb structure.

In an aspect, according to any one of the preceding aspects, the method includes applying a finishing process after the welding.

In an aspect, according to any one of the preceding aspects, the joint includes a braze joint.

In another aspect, a system for repairing a leading edge of a hollow fan blade including a first portion and a second portion secured together by a joint is disclosed. The hollow fan blade has an interior cavity under a vacuum. The system includes a purge box having a mount for securing the hollow fan blade during a first welding step. The system includes a vacuum chamber for retaining the hollow fan blade during a second welding step. The first welding step is different from the second welding step.

In an aspect, according to any one of the preceding aspects, the system includes an electron beam welding apparatus.

In an aspect, according to any one of the preceding aspects, the system includes a temperature monitoring device disposed on the hollow fan blade.

In another aspect, a method of repairing a hollow component is disclosed. The hollow component has at least two portions secured to each other by a joint and a cavity under a vacuum. The method includes removing a damaged section of the hollow component and obtaining a replacement portion of unitary construction. The method includes initially securing the replacement portion to the hollow component, and securing the replacement portion to the hollow component after the replacement portion is initially secured to the hollow component.

In an aspect, according to any one of the preceding aspects, the hollow component is a fan blade.

In an aspect, according to any one of the preceding aspects, securing the replacement portion to the hollow component after the replacement portion is initially secured to the hollow component includes electron beam welding the replacement portion to the hollow component.

In an aspect, according to any one of the preceding aspects, initially securing the replacement portion to the hollow component includes tungsten inert gas (TIG) welding the replacement portion to the hollow component.

BRIEF DESCRIPTION OF THE DRAWINGS

Illustrative aspects of the present disclosure are described in detail below with reference to the attached drawing figures and wherein.

DETAILED DESCRIPTION

Figure 1:
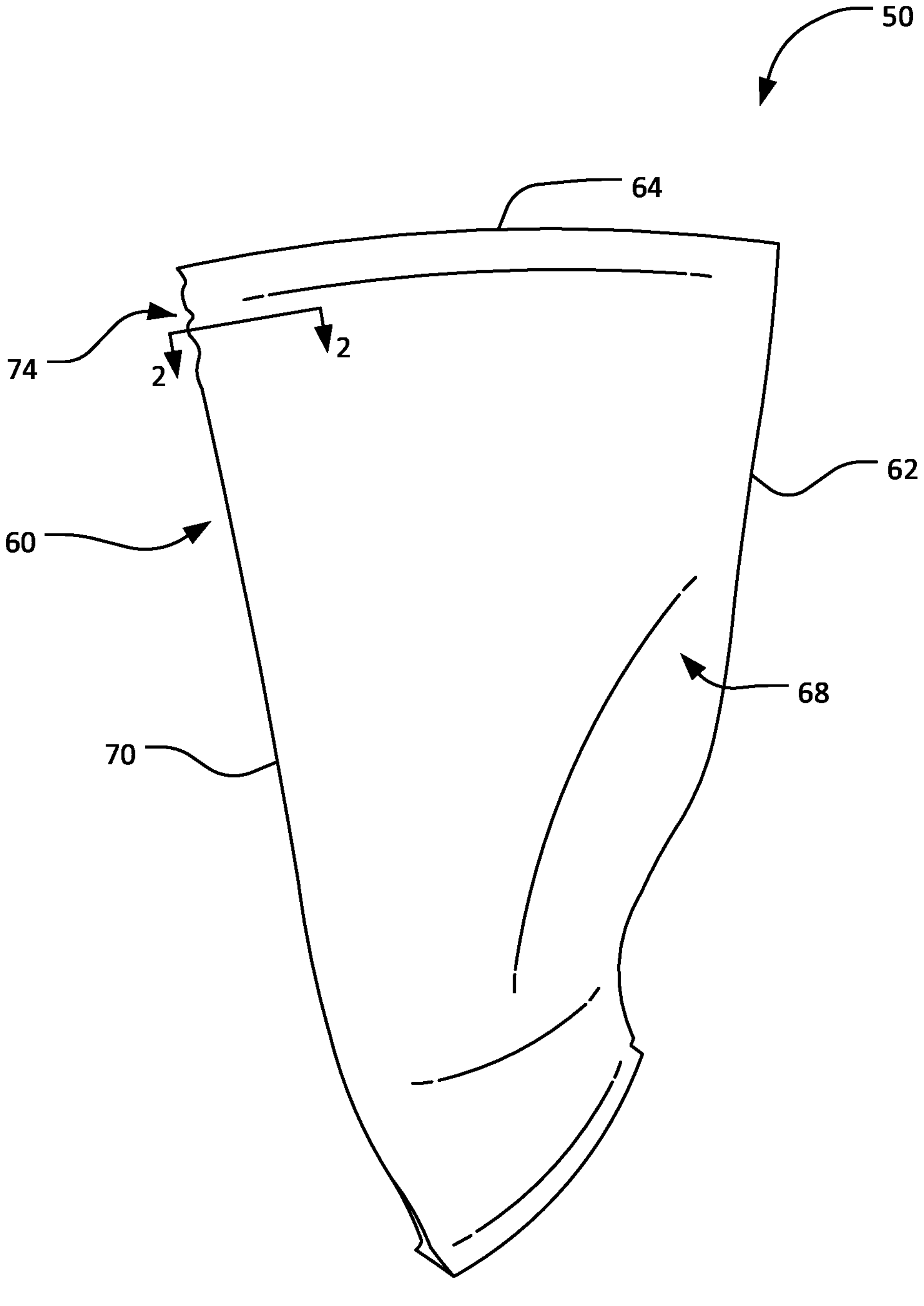
FIG. 1 is a perspective view of a hollow fan blade that has been damaged.

Fan blades direct air through and around the engine of the aircraft. Fan blades are generally attached to a fan disk, which may be rotated by a shaft driven by a gas turbine engine of the aircraft. Fan blades are the outermost rotating components of an aircraft engine. Because the fan blades are exposed to outside air, they may encounter foreign objects (e.g., birds, pebbles, volcanic ash, and sand particles), resulting in damage such as, but not limited to, grooves, nicks, scratches, cracks, tears, and the like. Such damage may adversely affect operational characteristics of a fan blade. One section of a fan blade that is particularly susceptible to damage is the fan blade leading edge. The leading edge is often worn down and shortened with use, thus reducing fan blade chord length (i.e., length of the fan blade cross section measured tip-to-tip). Such may undesirably impact fan blade efficiency, and in some cases, may render the fan blade unsuitable for use.

In aspects, a damaged leading edge of a hollow fan blade may be repaired using a welding process. A hollow fan blade may be typically made of two shells brazed together. The interior of a hollow fan blade may be under a vacuum, which aids in the structural integrity of the fan blade. Hollow fan blades have heretofore been considered unrepairable because conventional repair processes, such as welding, degrade the braze joint and eliminate the vacuum, rendering the blade unfit for repair or use. In an aspect, a portion of the leading edge is removed and rebuilt via a welding process. Care is taken to ensure that the innermost surface of the portion of the leading edge that is removed is at least a minimum safe distance away from the braze joint. Performing weld repair at the minimum safe distance (or a greater distance) ensures that the braze joint does not reach a temperature at which it is compromised. The damaged leading edge may therefore be repaired without impacting the braze joint and discharging the vacuum. In implementations, the temperature at and about the leading edge may be monitored during welding to confirm that the braze joint does not heat up to a temperature at which it is compromised.

Bypass ratio is one aspect of classifying an aircraft engine. Bypass ratio of an aircraft engine is the ratio between mass flow rate of the bypass stream to mass flow rate entering the core. For the same thrust, increasing bypass ratio may result in decreased fuel consumption. Bypass ratio may be increased by increasing size of fan blades. However, increasing size of fan blades may detrimentally increase weight of the engine. To keep this weight down, fan blades may be made of relatively lightweight material. More recently, one or more hollow cavities may be introduced in fan blades to minimize concerns associated with increased weight.

Aircraft fan blades that have incurred damage may be replaced. Alternately, and depending on the type of damage, fan blades may be repaired. Where the fan blades are solid in construction, they may be repaired using one or more conventional processes. For example, a solid fan blade may be repaired using glass bead blasting or peening, application of weld repair patches, etc. Hollow fan blades, which are less common than solid fan blades, may not be readily repaired using these conventional techniques. Such repair techniques may compromise the vacuum within hollow fan blade and render it unfit for use.

A hollow fan blade may be made from two shell halves and an intermediate supporting structure. The two shell halves may include a concave half and a convex half, and the intermediate supporting structure may be a honeycomb structure. The two shell halves may be arranged around the supporting structure and may be affixed to each other via a braze joint. Supporting structure may also be brazed to interior surfaces of the two shell halves. The hollow space which resides between the two shell halves alongside the supporting structure may be under a vacuum, creating a pressure differential across the fan blade and atmosphere. As pressure of the atmosphere outside the two shells substantially exceeds pressure inside the two shells, atmospheric pressure pushes on the shells with a compressive force that is proportional to the pressure differential inside and outside the shells. In effect, vacuum between the two shells may cause the shells to mimic Magdeburg hemispheres. The hollow fan blade may be thus held together not only by mechanical strength of the braze joints securing the two shells but also by the pressure differential between the inside of the hollow fan blade and the atmosphere.

If a braze joint securing the two shells is compromised, it may compromise the vacuum and destabilize the fan blade, rendering it unsuitable for repair or use. Commonly employed techniques usable to repair solid fan blades and comparable gas turbine parts, such as patch welding, may damage the braze joint of a hollow fan blade due to excessive heat associated with these techniques. Such conventional techniques may therefore eliminate the vacuum seal and damage the blade permanently. For at least this reason, hollow fan blades have heretofore been considered unrepairable. Embodiments of the disclosure may allow for repair of hollow fan blades without compromising braze joints thereof.

Figure 2:
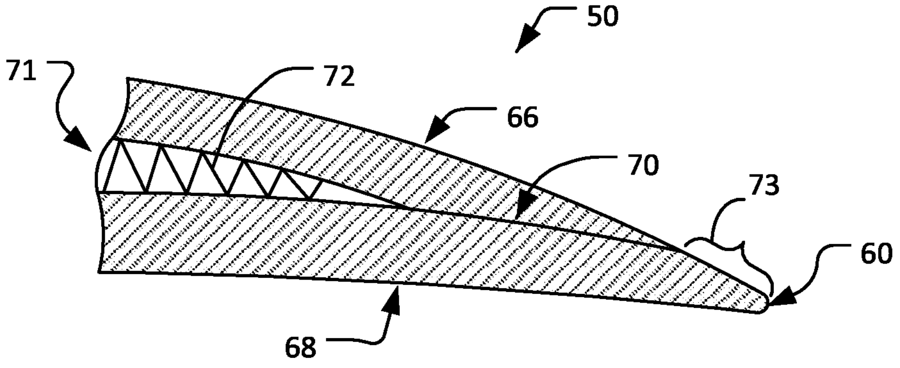
FIG. 2 is a cross-sectional view of the hollow fan blade of FIG. 1.

FIGS. 1 and 2 show a hollow fan blade 50. Hollow fan blade 50 has a leading edge 60, a trailing edge 62 that opposes leading edge 60, and a tip 64. Hollow fan blade 50 may include two shells, a convex or suction side shell 66 and a concave or pressure side shell 68 (see FIG. 2). Shells 66 and 68 may be secured together using brazing at bond line or joint 70 (FIG. 2). Leading edge 60 may be outboard bond line 70, i.e., there may be a non-zero distance between leading edge 60 and bond line 70. For example, as shown in FIG. 2, there may be a distance 73 between leading edge 60 and bond line 70 (i.e., between leading edge 60 and the outermost portion of bond line 70 closest to leading edge 60). An interior cavity 71 of hollow fan blade 50 may include a honeycomb structure 72, which may be sandwiched between convex shell 66 and concave shell 68. Interior cavity 71 may be under a vacuum.

As shown in FIG. 1, a portion 74 of leading edge 60 of blade 50 is damaged. Damage to leading edge 60 may have resulted from a collision of blade 50 with a foreign object (e.g., a bird, a stone, or the like). In aspects of the disclosure, damaged portion 74 of leading edge 60 is repaired without compromising braze joint 70. For example, leading edge 60, and specifically damaged portion 74 thereof, may be repaired using welding without impacting braze joint 70. Welding process may be any suitable welding process now known or subsequently developed, such as tungsten inert gas (TIG) welding, gas metal arc welding, shielded metal arc welding, flux-cored arc welding, etc. In an implementation, TIG welding may be employed.

In some aspects, hollow fan blade 50 may be repaired using the same or similar material that constitutes fan blade 50. In an implementation, a bulk composition analysis of hollow fan blade 50 may be performed to determine constituent(s) of blade 50. Hollow fan blades, including braze joints thereof, are typically formed of Titanium or a Titanium alloy (e.g., Ti64 alloy). Hollow fan blade 50 may be formed of Titanium or a Titanium alloy. Hollow fan blade 50 may additionally or alternately include aluminum or stainless steel. One having skill in the art will thus understand that techniques described herein are applicable to fan blades formed of any suitable metal(s). Further, techniques described herein may be usable to fix other components having a braze or other such joint securing two or more walls defining a cavity under a vacuum.

Braze joint 70 of hollow fan blade 50 may not be heated beyond a certain temperature, as such may unduly alter the physical characteristics of braze joint 70 and damage blade 50. For example, Applicant has discovered that the structural integrity of braze joint 70 including Titanium degrades beyond repair at or around 720 °C (around 993.2K). At or around this temperature, physical change in joint 70 may compromise the vacuum within hollow fan blade 50. For this reason, it may be prudent to ensure that braze joint 70 does not reach this temperature. The temperature at which a joint of a hollow fan blade, such as the braze joint 70 of the hollow fan blade 50, distorts beyond repair and discharges the vacuum therein, may also be referred to herein as the "distortion temperature." One having skill in the art will understand that the distortion temperatures of joints of different hollow fan blades may differ based on the construction of these blades and joints.

Welding temperatures may easily exceed the distortion temperature for the braze or other joint of a particular blade. For example, TIG welding temperatures may reach 3,000 °C (3,723.2K) or more—far greater than the distortion temperature of joint 70 of hollow fan blade 50. Conventional wisdom therefore counsels against repairing hollow fan blades using welding processes, such as patch welding or welding in layers of material, as exorbitant welding temperatures may destruct braze joint 70 and discharge the vacuum, rendering the fan blade 50 unfit for use.

Figure 3A:
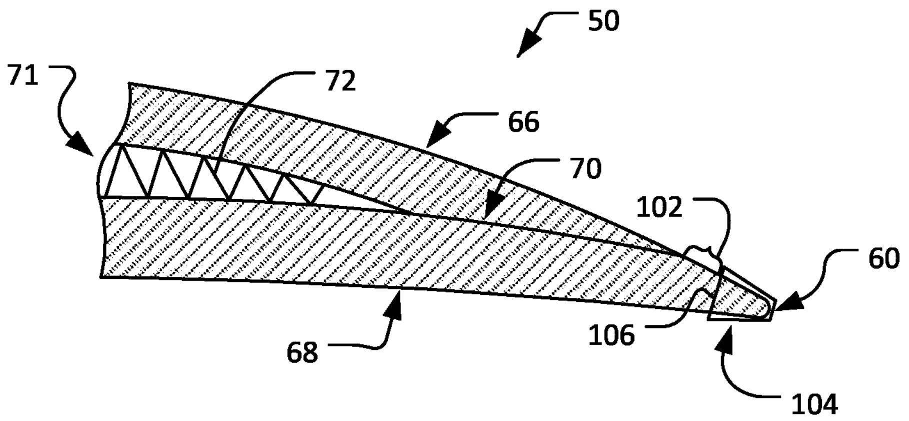
FIG. 3A is a cross-sectional view of the blade in FIG. 2 illustrating a cutback region thereof.

As shown in FIG. 3A, to prepare hollow fan blade 50 for the welding repair process, a minimum safe distance 102 from bond line 70 may be determined. As described herein, minimum safe distance 102 may be a distance from bond line 70 at which a welding repair may be performed without causing bond line 70 to reach or exceed the distortion temperature. Minimum safe distance 102 may define a cutback region 104 outboard the minimum safe distance 102. Specifically, cutback region 104 may extend inboard from leading edge 60 such that an innermost surface 106 of cutback region 104 is spaced apart from the bond line 70 at least by the minimum safe distance 102. The portion of blade 50 within cutback region 104 may be removed and repaired using a welding process.

In an aspect, minimum safe distance 102 is between about 0.125 inches (about 3.175 mm) and about 0.375 inches (about 9.525 mm). For example, a user may safely remove material approximately 0.25 inches (approximately 6.35 mm) away from braze joint 70. In aspects, cut back region 104 may encompass an area of fan blade 50 up to about 0.200 inches (about 5.08 mm), e.g., between 0.1 inches (2.54 mm) and 0.3 inches (7.62 mm) below the type certificate holder (TCH) minimum chord dimension for a given hollow fan blade 50 to be repaired. One having skill in the art will understand that the minimum safe distance may vary from blade to blade depending, e.g., on the constitution of the blade and the location of the braze joint.

Figure 3B:
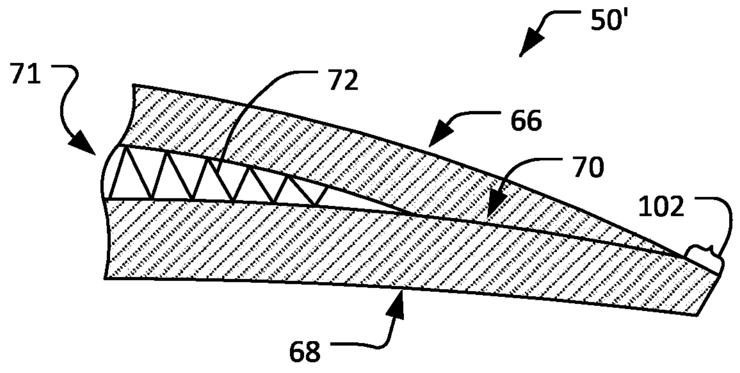
FIG. 3B is a cross-sectional view of the blade in FIG. 3A after a portion of the blade within the cutback region has been removed.

FIG. 3B shows a hollow blade 50'. Hollow blade 50' is an example of hollow blade 50 after a portion of blade 50 within cutback region 104 has been removed. Removal of the portion of blade 50 within cutback region 104 may leave behind a weld foundation 108. Weld foundation 108 may be a smooth surface that can readily accept welding material. Because weld foundation 108 is spaced apart from bond line 70 by at least the minimum safe distance 102, the bond line 70 may not reach or exceed the distortion temperature during the welding process.

Figure 3C:
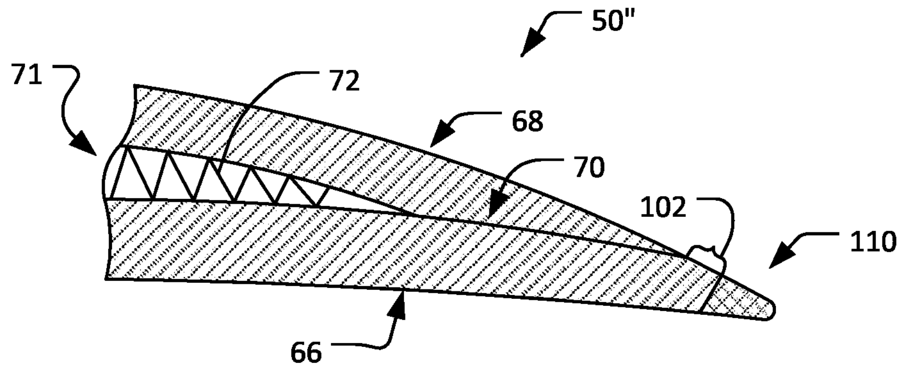
FIG. 3C is a cross-sectional view of the blade in FIG. 3A after the blade has undergone a welding process.

FIG. 3C shows a hollow blade 50", that may be an example of hollow blade 50' after a welded section 110 has been welded onto weld foundation 108 to repair the blade. Welded section 110 may be added to hollow blade 50' without impairing braze joint 70 or the vacuum within blade 50.

Figure 4A:
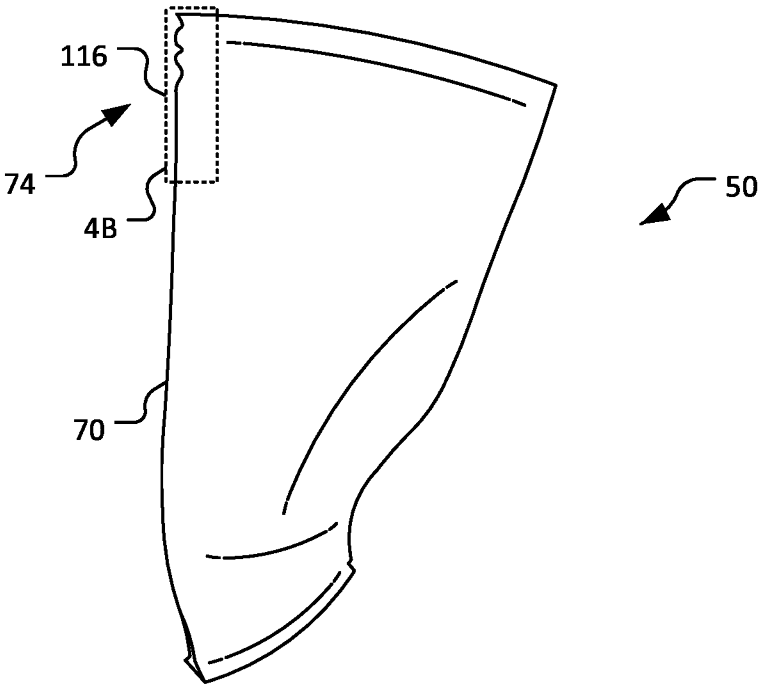
FIG. 4A is another perspective view of the blade of FIG. 1.
Figure 4B:
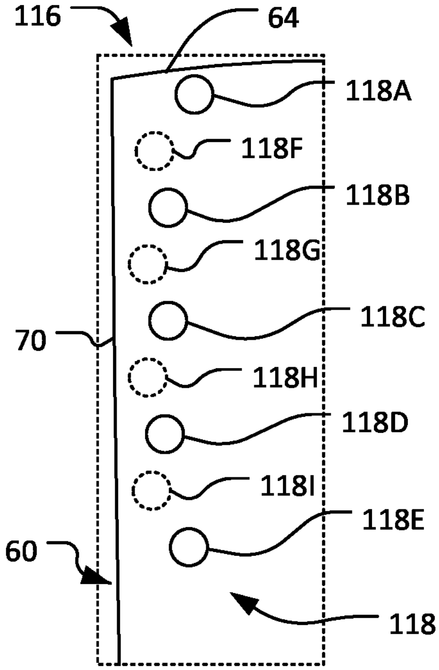
FIG. 4B is a perspective view of a section of the damaged blade with thermocouples arranged thereon for monitoring temperature.

In some aspects, to ensure that braze joint 70 is not compromised during the welding process, a plurality of thermocouples 118 (FIG. 4B) or other suitable temperature sensors may be situated proximate bond line 70 and weld foundation 108. Specifically, FIG. 4A shows a section 116 of the damaged hollow fan blade 50 that encompasses damaged portion 74 of leading edge 60. As shown in FIG. 4B, a plurality of thermocouples 118, e.g., thermocouples 118A-118I, may be disposed within section 116 adjacent braze joint 70 (e.g., at locations between braze joint 70 and weld foundation 108). Thermocouples 118A-118I may allow for temperature at and about braze joint 70 to be monitored, to ensure that braze joint 70 does not approach, reach, or exceed the distortion temperature.

In the illustrated embodiment, thermocouples 118A-118E are disposed on the convex or suction shell 66 and thermocouples 118F-118I are located on the concave or pressure shell 68. Temperature of thermocouples 118A-118I may be monitored during the weld repair process. If any thermocouple 118A-118I indicates that the temperature is approaching the distortion temperature, the welding process may be halted or otherwise modified to prevent breakage of joint 70.

The distance between a thermocouple 118A-118I and bond line 70 may impact usefulness of the temperature readings. For example, if a thermocouple is too far away from joint 70, the temperature reading may not correlate to or indicate temperature at joint 70. In an implementation, thermocouples 118A-118I may be spaced about an inch from each other in a radial or y-axis direction, and may be aligned anywhere from about 0.240 inches (6.096 mm) to 0.783 inches (19.888 m) circumferentially, or in the x-axis direction, from leading edge 60. Table 1 below outlines the position of thermocouples 118A-118I, in one example.

TABLE 1

Position of Thermocouples 118A-118I

| TC Location | Convex/ Concave Side | X-Axis [Measured from LE 60 to bond line 70] (mm) | Y-Axis [Measured from Tip 64 to TC 118 Location] (mm) |
|---|---|---|---|
| T1 (118A) | Convex | 0.783 (19.89) | 0.1 (2.54) |
| T2 (118B) | Convex | 0.511 (12.97) | 2.1 (53.34) |
| T3 (118C) | Convex | 0.507 (12.89) | 4.1 (104.14) |
| T4 (118D) | Convex | 0.487 (12.37) | 6.1 (154.94) |
| T5 (118E) | Convex | 0.677 (17.19) | 8.1 (205.74) |
| T1.5 (118F) | Concave | 0.360 (9.15) | 1.1 (27.94) |
| T2.5 (118G) | Concave | 0.257 (6.54) | 3.1 (78.74) |
| T3.5 (118H) | Concave | 0.240 (6.10) | 5.1 (129.54) |
| T4.5 (118I) | Concave | 0.296 (7.51) | 7.1 (180.34) |

Of course, values in Table 1 are merely exemplary and are not intended to be independently limiting. One having skill in the art will understand that thermocouples 118A-118I may be arranged differently (e.g., distance between two successive thermocouples 118A-118I may be greater or less than about one inch, and depending on the particular fan blade, may be further away or closer to the leading edge). In some implementations, thermocouples 118A-118I may be secured (e.g., temporarily) to fan blade 50 using any suitable method, such as with an adhesive or via spot welding.

Figure 5:
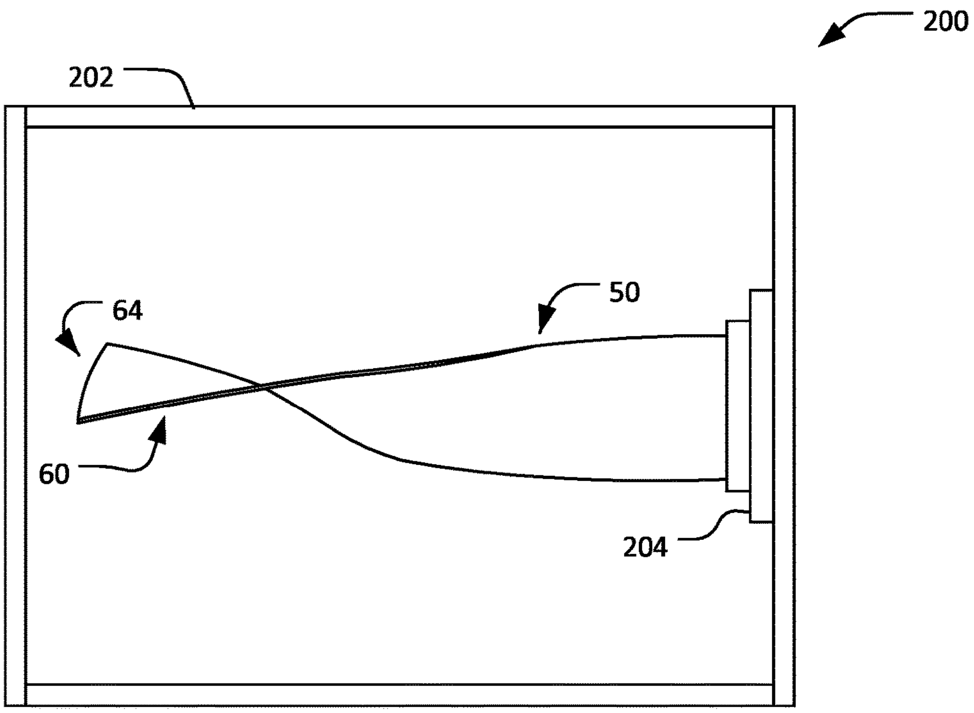
FIG. 5 shows a side view of a purge box for retaining the damaged blade of FIG. 1 during a repair process.

In aspects, hollow fan blade 50 may be situated within a purge box 200 during the repair process. FIG. 5 shows an example purge box 200. Purge box 200 may have a frame 202 and a mount 204. Mount 204 may be configured to securely retain at least a portion of hollow fan blade 50, such as at the dovetail thereof. Purge box 200 may serve to hold blade 50 steady as blade 50 undergoes the welding process. In aspects, the purge box may be filled with a gas, e.g., an inert gas such as argon. One having skill in the art would understand that the repair process may be adversely affected by Oxygen. The inert gas inside the purge box may purge Oxygen in the purge box 200 and curtail oxidation of the blade 50 during the repair process.

Figure 6:
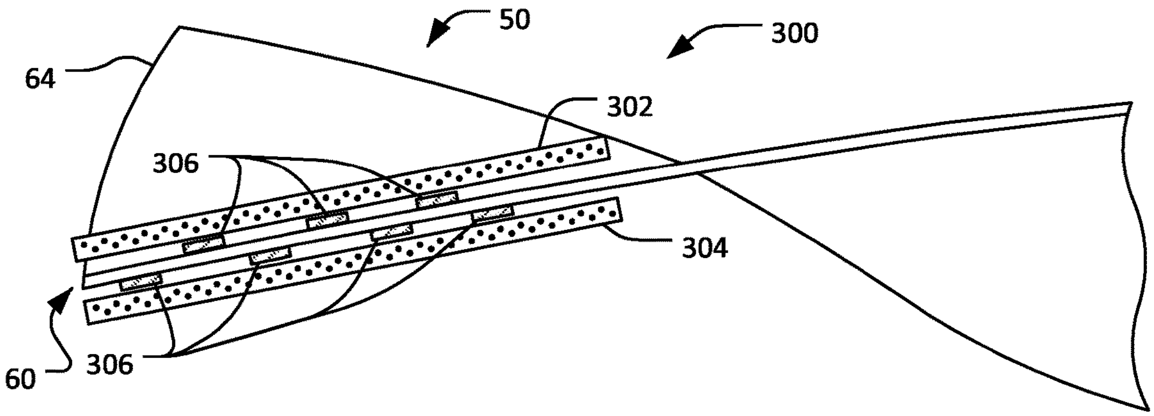
FIG. 6 shows a side view of the damaged blade of FIG. 1 with gas pads and cooling systems.

In some aspects, in addition to purge box 200, gas pads 300 may be employed to facilitate the weld repair process (see FIG. 6). Gas pads 300 may include a gas pad 302 and a gas pad 304. Gas pad 302 may be situated on convex shell 66 proximate weld foundation 108 and gas pad 304 may be situated on concave shell 68 proximate weld foundation 108. Gas pads 302 and 304 may disperse inert gas local to the weld material and eliminate or minimize any oxidation of blade 50.

In an implementation, one or more chilling or cooling systems 306 may be arranged along or proximate leading edge 60. These cooling systems 306 may include, for example, copper chill blocks and/or water-cooled blocks which may serve to bring down temperature of fan blade 50 during the welding process. Cooling systems 306 may help ensure that braze joint 70 does not approach distortion temperature during the welding repair process.

Figure 7:
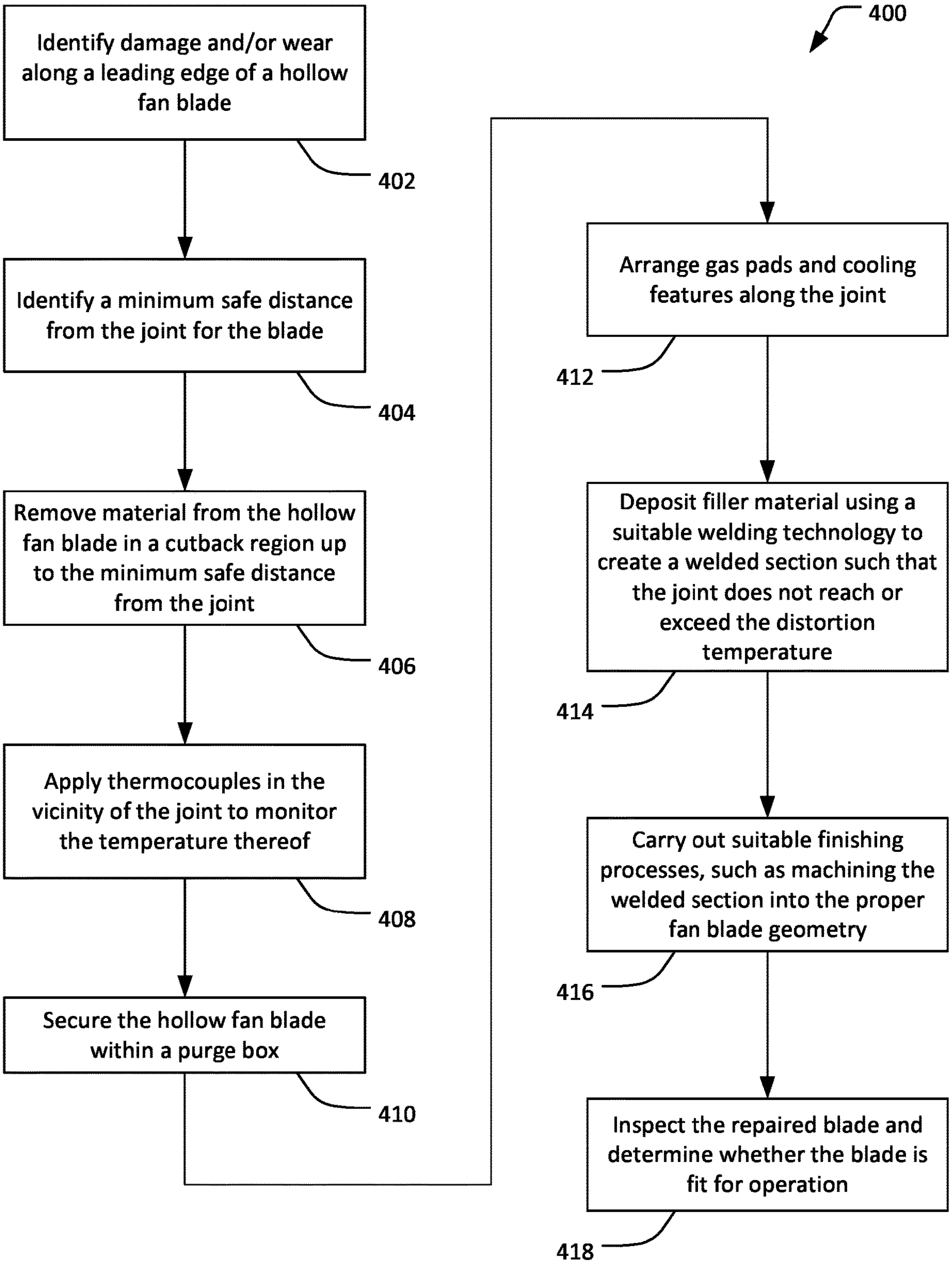
FIG. 7 is a flowchart illustrating an example method of repairing a hollow fan blade.

FIG. 7 is a flow chart outlining an example method 400 to repair hollow fan blade 50. At step 402, the portion (e.g., damaged portion 74) of leading edge 60 that has incurred damage may be identified. The damage may include nicks, scratches, pits, or other damage. At step 404, a minimum safe distance from the braze joint (e.g., minimum safe distance 102 from bond line 70) may be identified for the particular blade being repaired. The minimum safe distance may be a distance from the braze joint at which welding repair may be performed without causing the braze joint to reach or exceed the distortion temperature. At step 406, a region of the leading edge of the blade within a cutback region (e.g., cutback region 104) may be removed to yield a clean weld foundation (e.g., weld foundation 108). Cutback region 104 may be outboard the braze joint, and as such, may not enter the hollow interior of fan blade 50. Specifically, the weld foundation may be spaced apart from braze joint (e.g., bond line 70) at least by the minimum safe distance. The minimum safe distance may provide a buffer of material from the welding location for the repair and the braze joint such that the braze joint is unaffected by the heat generated from the welding process.

At step 408, a plurality of thermocouples (e.g., thermocouples 118A-118I) may be arranged along the braze joint associated with the damaged portion of the blade. The thermocouples may be temporarily affixed, using spot welding or adhesive for example. The thermocouples may allow for the temperature of the fan blade proximate the bond line of the joint to be monitored during the welding repair process, to ensure temperature of the bond line does not reach the distortion temperature.

At step 410, the hollow fan blade may be secured within a purge box (e.g., may be fixed to mount 204 of purge box 200) to minimize the chance that oxidation of the fan blade will occur during the weld repair process. At step 412, gas pads (e.g., gas pads 302 and 304), alone or together with cooling features (e.g., cooling features 306) may be located along the bond line of the blade portion being repaired.

At step 414, any suitable welding technology now known or subsequently developed (e.g., but not limiting of the disclosure, TIG welding, gas metal arc welding, shielded metal arc welding, flux-cored arc welding, electron beam welding, etc.) may be used to weld material to the weld foundation (e.g., welded section 110 may be added via welding to weld foundation 108). In aspects, welded material may be added in layers and each layer may be deposited after some time has elapsed after deposition of the prior layer. In an aspect, the welding process may include forming weld buildup in layers, including between one layer and twelve or more layers, where each layer can be applied in a window of in a range between about four minutes and about six minutes. The application of each layer may be spaced with about a minute or more between each layer. The timing of the application of layers, as embodied by the disclosure, may be provided in any number of layers, with any spacing and time period in between layers. The layers may be built onto the fan blade in any pattern, including but not limited to, starting at the middle of the blade and moving towards the blade tip. Care may be taken to ensure the distortion temperature of the braze joint (e.g., joint 70) is not exceeded during the welding process so as to not compromise the vacuum of the fan blade 50.

At step 416, the blade (e.g., the newly welded material) may undergo finishing to bring the blade within the desired specifications. Finishing the blade may involve, for example, machining down the weld buildup to ensure the shape and size of the repaired blade are within required tolerances, adding a surface coating, etc. In aspects, a machining tool (e.g., a 5-axis machining tool) may be employed for finishing the blade and completing the repair process. At step 418, the repaired blade may be inspected to ensure the blade is fit for operation. For example, the repaired blade may be visually inspected. In implementations, the repaired blade may be evaluated using x-ray scanning, depth profiling, fluorescent penetrant inspection, eddy current inspection, etc. Additional welding may be performed if needed in view of this evaluation to ensure the repaired blade is airworthy.

One having skill in the art will understand that steps of method 400 may be modified, added to, and/or omitted as desired, and that such considerations have been contemplated and are within the scope of the disclosure. For example, one having skill in the art will understand that the step of arranging thermocouples may take place before material is removed from the fan blade to create the cutback region, that thermocouples may be omitted entirely, or that a different temperature sensor(s) may be employed.

As noted, one damaged hollow fan blade may require a solitary layer (or pass) of TIG welding for repair, whereas another blade that has incurred more damage may require multiple welding passes. Each TIG welding pass may require some time to complete, and the blade may need to be cooled down after each welding pass is completed and before the next welding pass is initiated. For example, in practice, it may take up to ten to twelve hours to repair a hollow fan blade using method 400 where a repair requires eight or more welding passes. Where the number of blades being repaired is large, repair of blades may take a considerable amount of time and effort, particularly where the blades require multiple passes (e.g., eight or more passes) of TIG welding for repair.

Figure 8:
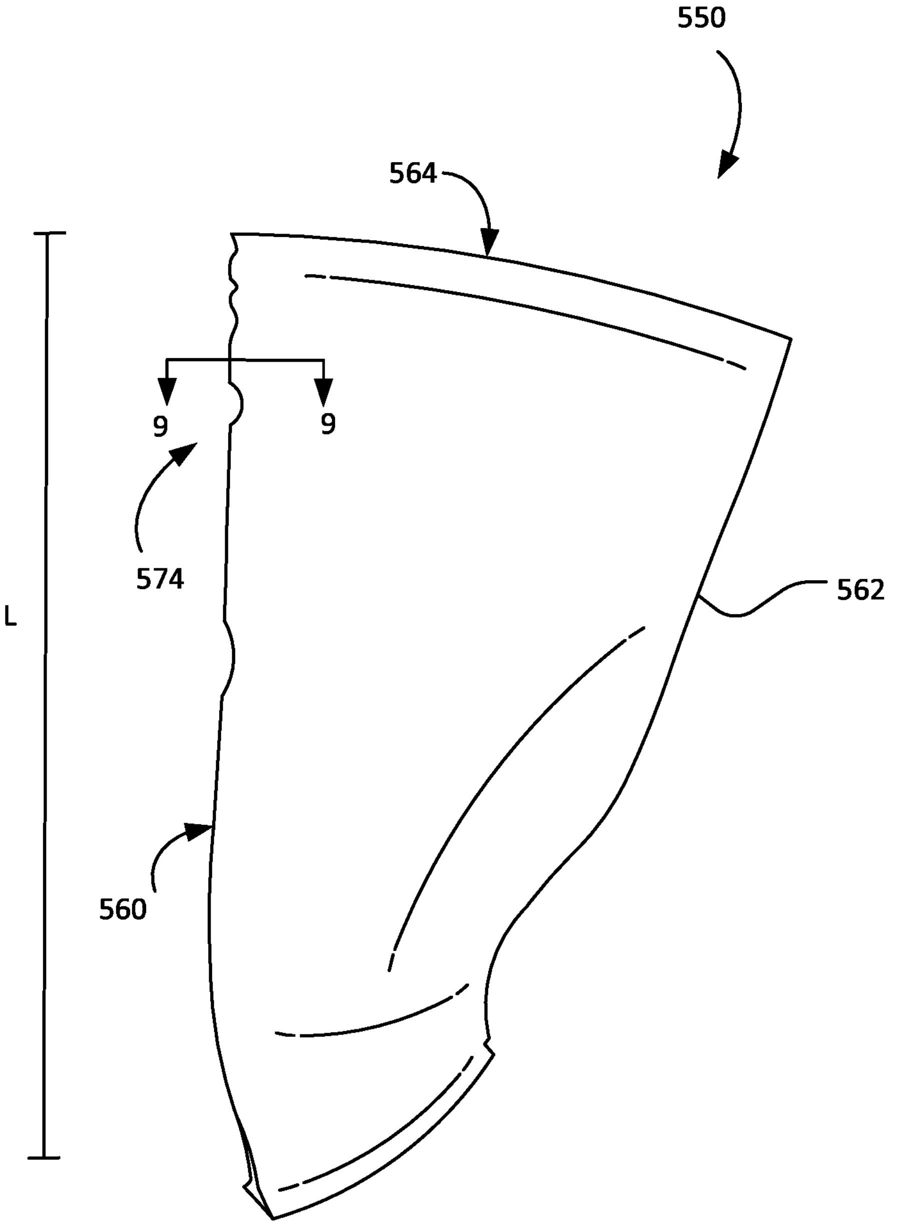
FIG. 8 is a perspective view of another damaged hollow fan blade.

FIG. 8 is a perspective view of a hollow component, such as but not limited to a fan blade (hereinafter hollow fan blade 550) having a leading edge that has incurred damage. Hollow fan blade 550 may be similar to hollow fan blade 50 shown in FIGS. 1 and 2. Specifically, hollow fan blade 550 may have a leading edge 560, a trailing edge 562 that opposes leading edge 560, and a tip 564. In the illustrated embodiment, leading edge 560 has a length L. A portion 574 of leading edge 560 of blade 550 is shown to be damaged.

Figure 9:
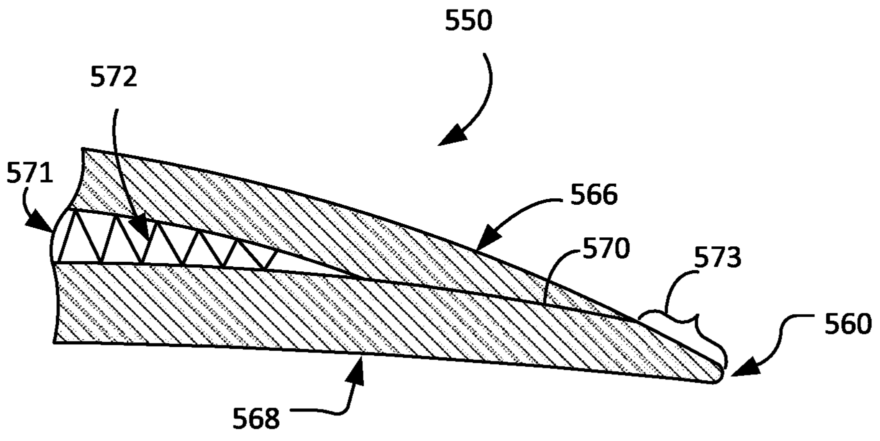
FIG. 9 is a cross-sectional view of the hollow fan blade of FIG. 8.

As shown in FIG. 9, hollow fan blade 550 may include two shells, a convex or suction side shell 566 and a concave or pressure side shell 568. Shells 566 and 568 may be secured together using brazing or another suitable technique at bond line or joint 570. Leading edge 560 may be outboard bond line 570, i.e., there may be a non-zero distance between leading edge 560 and bond line 570. In the illustrated example, there is a distance 573 between leading edge 560 and bond line 570 (i.e., between leading edge 560 and the outermost portion of bond line 570 closest to leading edge 560). An interior cavity 571 of hollow fan blade 550 may, optionally, include a honeycomb structure 572, which may be sandwiched between convex shell 566 and concave shell 568. Interior cavity 571 may be under a vacuum.

Figure 10A:
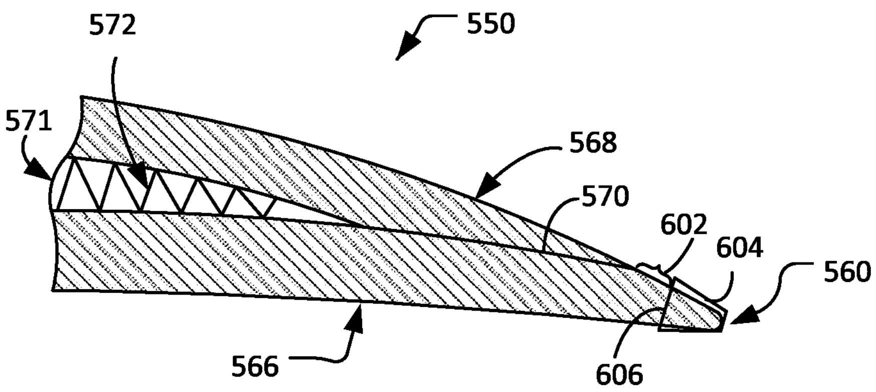
FIG. 10A is a cross-sectional view of the blade in FIG. 9 illustrating a cutback region thereof.

To prepare hollow fan blade 550 for the welding repair process, a minimum safe distance 602 from bond line 570 may be determined (see FIG. 10A). Minimum safe distance 602, akin to minimum safe distance 102 shown in FIG. 3B, may be a distance from bond line 570 at which a welding repair may be performed without causing bond line 570 or blade 550 to reach or exceed the distortion temperature. Minimum safe distance 602 may define a cutback region 604 outboard minimum safe distance 602. Specifically, cutback region 604 may extend inboard from leading edge 560 such that an innermost surface 606 of cutback region 604 is spaced apart from bond line 570 at least by minimum safe distance 602. The portion of the blade 550 within the cutback region 604 may be removed and repaired as described herein. The minimum safe distance may provide a buffer of material from the welding location for the repair and the braze joint such that the braze joint is unaffected by the heat generated from the welding process.

Minimum safe distance 602, in certain embodiments, may be between about 0.125 inches (about 3.175 mm) and about 0.375 inches (about 9.525 mm). For example, a user may safely remove material approximately 0.25 inches (approximately 6.35 mm) away from braze joint 570. In certain exemplary aspects, cut back region 604 may encompass an area of fan blade 550 up to about 0.200 inches (about 5.08 mm), e.g., between 0.1 inches (2.54 mm) and 0.3 inches (7.62 mm) below the type certificate holder (TCH) minimum chord dimension for a given hollow fan blade 550 to be repaired. As noted above, these numerical values are not intended to be independently limiting, and one having skill in the art will understand that the minimum safe distance from the bond line may differ from one hollow fan blade to the next depending, e.g., on the constitution of the blade and the location of the braze joint.

Figure 10B:
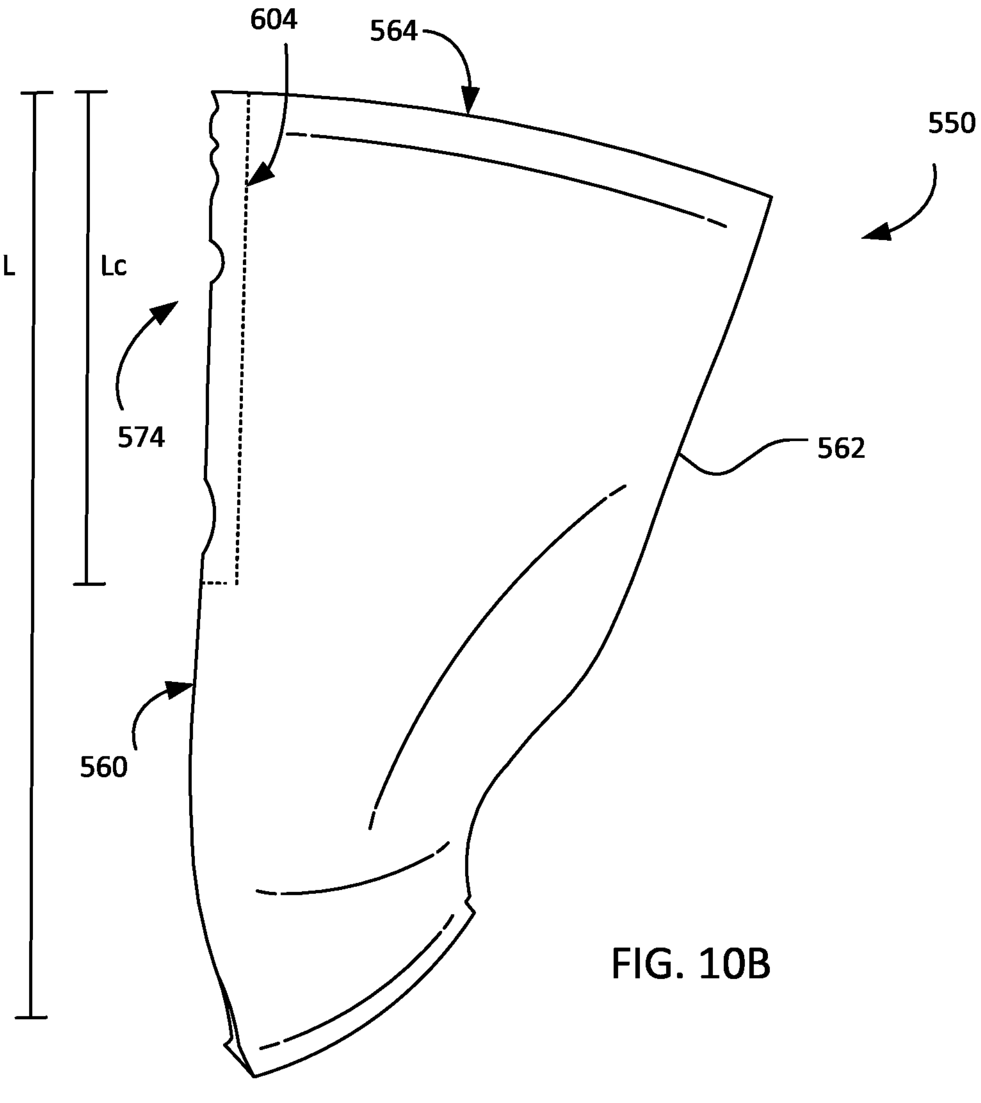
FIG. 10B is a perspective view of the hollow fan blade of FIG. 8 showing the cutback region of FIG. 10A.

FIG. 10B shows another view of cutback region 604. Cutback region 604 has a length Lc. Length Lc may be a non-negligible percentage of the length L of leading edge 560. In some aspects, length Lc may be between about 20% and about 80% of length L, in a range between about 30% to about 70% of length L, in a range between about 40% to about 60% of length L, or about 50% of length L and/or preferably, may be in a range between about 30% and about 70% of length L. For example, length Lc may be in a range between about 20% to about 80% of length L, in range between about 30% to about 70% of length L, in a range between about 40% to about 60% of length L, and/or preferably about 50% of length L. Cutback region 604 may extend up to the tip 564 as shown. In other examples, cutback region 604 may initiate below tip 564.

Figure 11A:
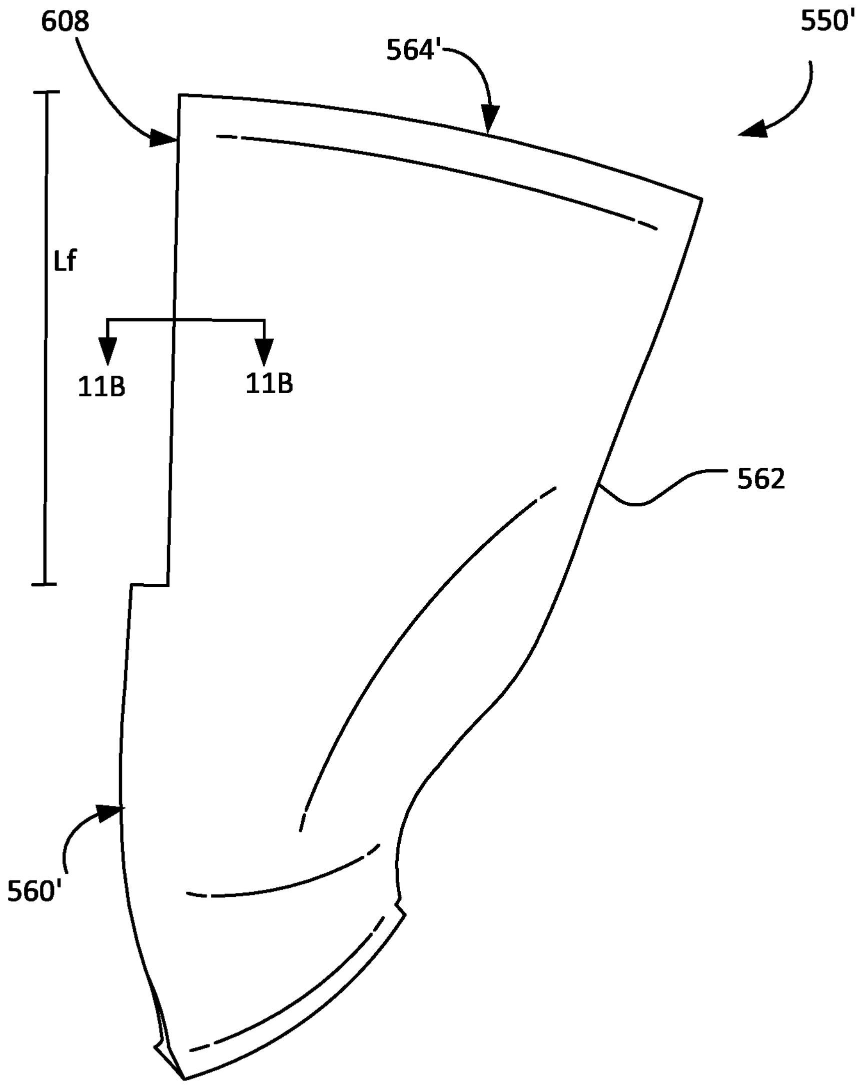
FIG. 11A is a perspective view of the hollow fan blade of FIG. 8 after a portion of the blade within the cutback region has been removed.
Figure 11B:
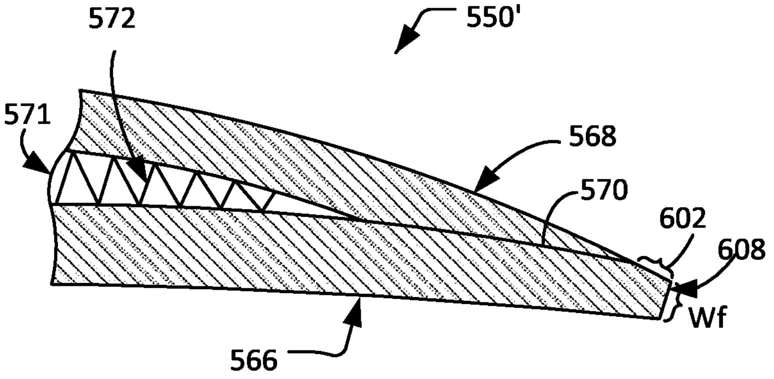
FIG. 11B is a cross-sectional view of the hollow fan blade of FIG. 11A.

FIGS. 11A and 11B show a hollow fan blade 550' having a leading edge 560' and a tip 564'. Hollow blade 550' is an example of hollow blade 550 after the portion of blade 550 within cutback region 604 (see FIGS. 10A and 10B) has been removed. Removal of the portion of blade 550' within cutback region 604 may leave behind a weld foundation 608. Weld foundation 608, in certain aspects of the disclosure, may have a length Lf, which may be generally the same as length Lc of cutback region 604. Weld foundation 608 may further have a width Wf. In some aspects of the disclosure, weld foundation 608 may be machined and smoothed such that weld foundation 608 can readily accept a replacement portion, as described herein. Because weld foundation 608 is spaced apart from bond line 570 by at least minimum safe distance 602, bond line 570 may not reach or exceed the distortion temperature during the welding process.

Figure 12:
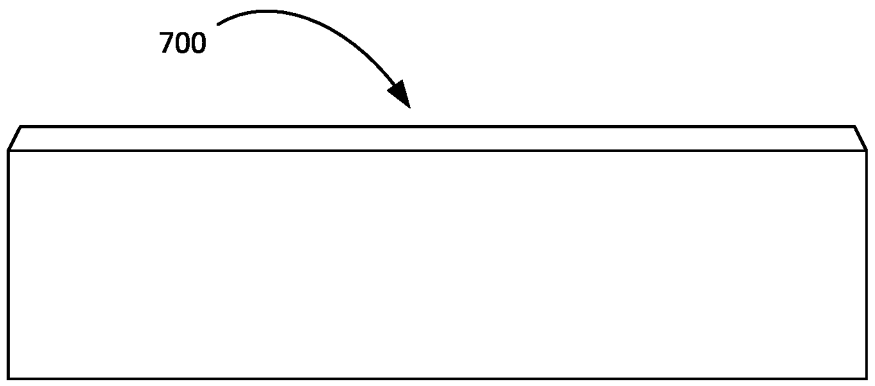
FIG. 12 is a perspective view of a preform for forming a replacement portion.

Focus is directed to FIG. 12, which shows a preform, block or slab (herein "preform" 700). A unitary replacement portion usable in the repair process may be formed from preform 700. In aspects, preform 700 can be made of titanium or a titanium alloy (e.g., Ti64 alloy). In other examples, preform 700 may be made of aluminum, stainless steel, or another suitable metal. In some aspects, preform 700 may be made of the same metal or metal alloys as blade 550. Preform 700 may have a unitary construction (i.e., may be a unibody piece). While preform 700 shown in the figures is rectangular, preform 700 may take on any suitable shape.

Figure 13A:
FIG. 13A is a perspective view of the replacement portion formed in the preform.
Figure 13B:
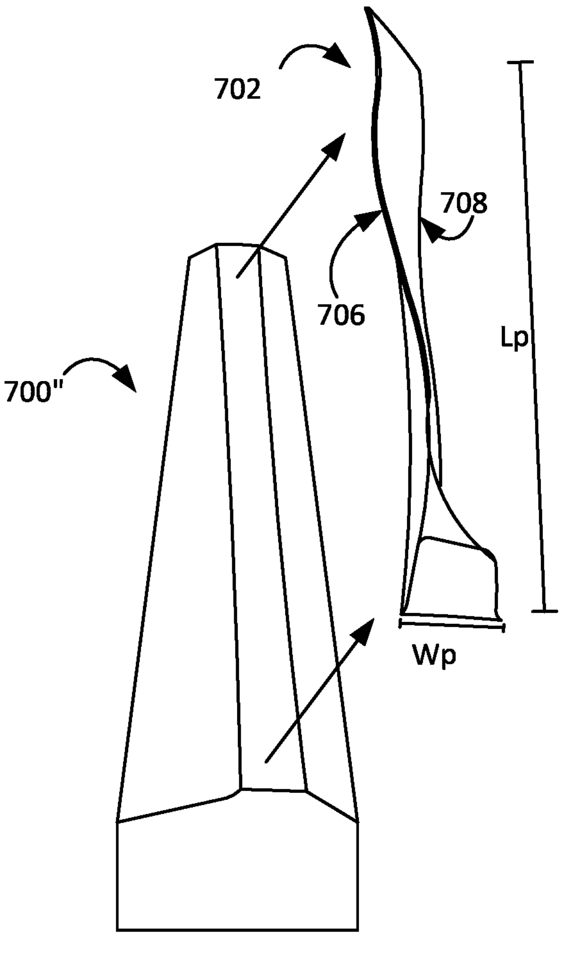
FIG. 13B is a perspective view of the replacement portion disassociated from the preform.

FIG. 13A shows a preform 700', which is an example of preform 700 after a replacement portion (also referred to as a leading edge portion) 702 is machined therein. FIG. 13B shows a preform 700", which is an example of preform 700' after replacement portion 702 has been separated from preform 700'. As shown in FIG. 13B, replacement portion 702 may have an outer section 706 and an inner section 708. Inner section 708 may have a length Lp, which may generally correspond to length Lf of weld foundation 608 and length Lc of cutback region 604. Replacement portion 702, e.g., inner section 708 thereof, may have a width Wp. In certain aspects of the embodiments, width Wp may be greater than width Wf of weld foundation 608.

Replacement portion 702 may be initially secured to hollow fan blade 550', i.e., to weld foundation 608 thereof. A first welding technique may be associated with the initial or first securement. In an aspect, initial securement may involve TIG welding replacement portion 702, i.e., inner section 708 thereof, to weld foundation 608. In examples of the disclosure, replacement portion 702 may be initially secured to weld foundation 608 of fan blade 550' via TIG welding in a single pass, or in a small number of passes. In some examples, another suitable welding technique (such as gas metal arc welding, shielded metal arc welding, flux-cored arc welding, etc.) may be used to initially secure replacement portion 702 to weld foundation 608.

Figure 14:
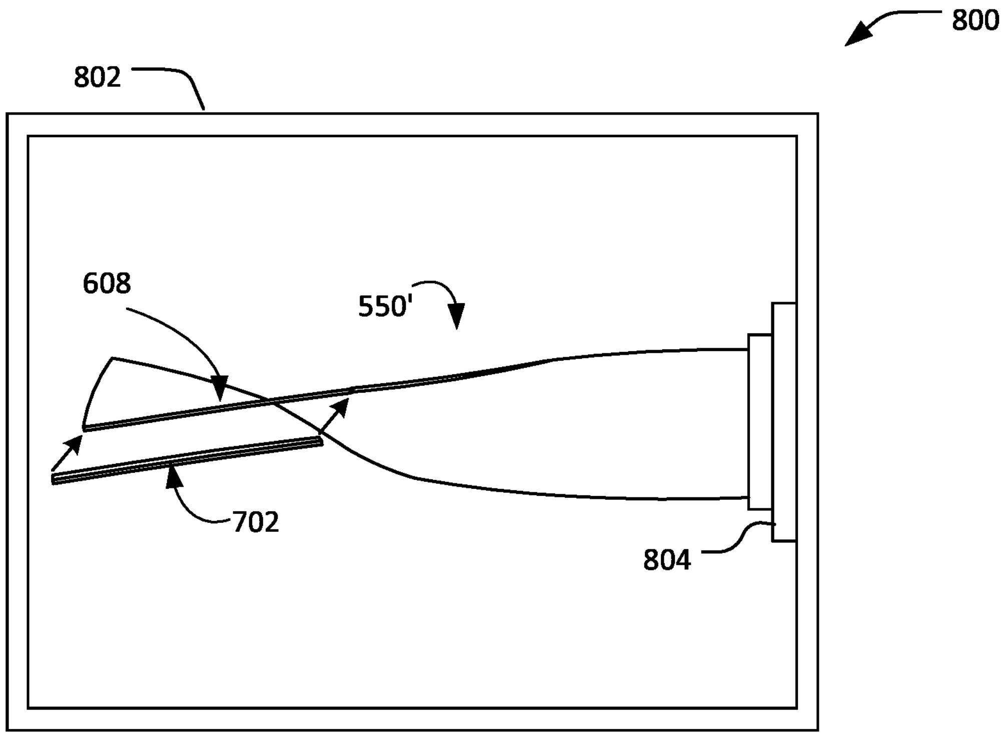
FIG. 14 shows a side view of a purge box for retaining the damaged blade of FIG. 8 during a repair process.

In a non-limiting aspect of the disclosure, replacement portion 702 may be initially secured to weld foundation 608 of fan blade 550' in a purge box 800 (see FIG. 14). Purge box 800 may be similar to purge box 200 and may have a frame 802 and a mount 804. Mount 804 may be configured to securely retain at least a portion of hollow fan blade 550', such as but not limiting of the embodiment, the dovetail thereof. Purge box 800 may hold blade 550' steady as replacement portion 702 is secured (e.g., TIG welded) to weld foundation 608. Purge box 800 may be configured to ensure that the initial securement is effectuated in an environment devoid or generally devoid of oxygen, as oxygen may adversely affect the TIG welding process. In aspects, an inert gas such as argon may be used to purge oxygen in purge box 800 and reduce oxidation of blade 550'.

Figure 15:
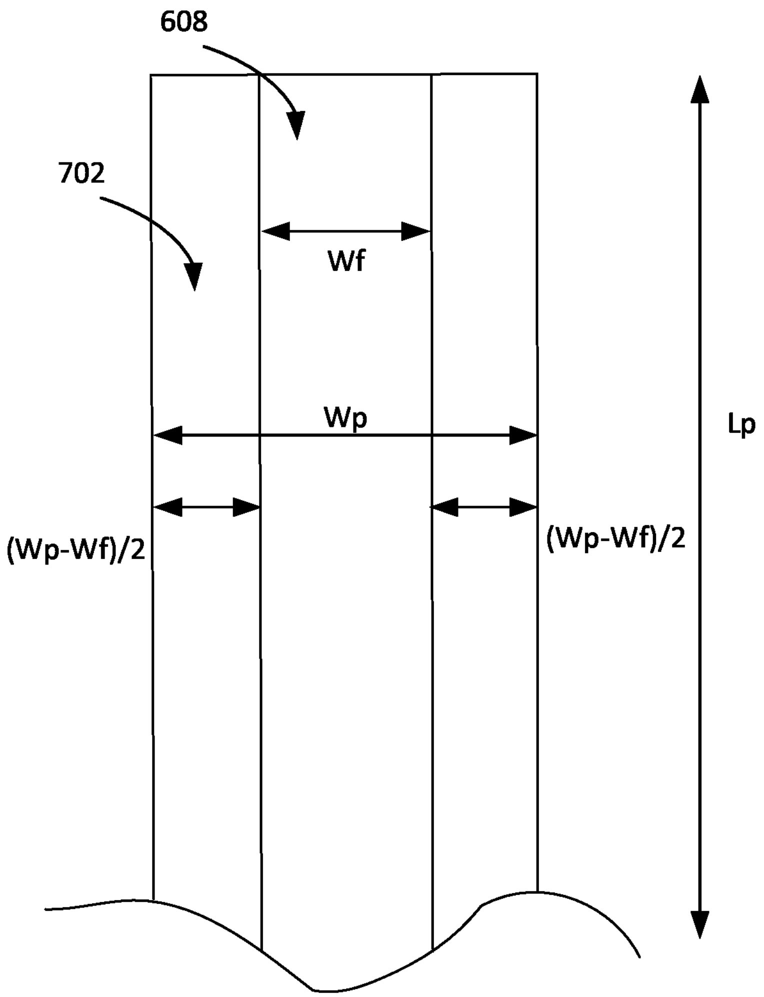
FIG. 15 is a schematic illustrating a width of the replacement portion relative to a width of a weld foundation of the hollow fan blade.

FIG. 15 schematically shows replacement portion 702 initially secured to weld foundation 608. As noted, width Wp of inner section 708 of replacement portion 702 may be greater than width Wf of weld foundation 608. In aspects of the disclosure, replacement portion 702 may be laterally centered with respect to weld foundation 608 such that replacement portion 702 extends beyond weld foundation 608 on both sides generally equally. For example, but not limiting of the embodiments, where Wf is about 100 nm and Wp is about 150 nm, replacement portion 702 may be laterally centered on weld foundation 608 such that replacement portion 702 extends about 25 nm (i.e., (Wp−Wf)/2) past the left most edge of the weld foundation 608 and extends generally the same distance past the right most edge of the weld foundation 608. These portions of replacement portion 702 that extend beyond weld foundation 608 because of the comparatively greater width of replacement portion 702 may subsequently provide filler material resulting from welding, or other attachment schemes, to permanently secure replacement portion 702 to weld foundation 608. The numerical values of the respective widths of the weld foundation 608 and the replacement portion 702 provided herein are merely exemplary and are not intended to be independently limiting of the disclosure.

Figure 16:
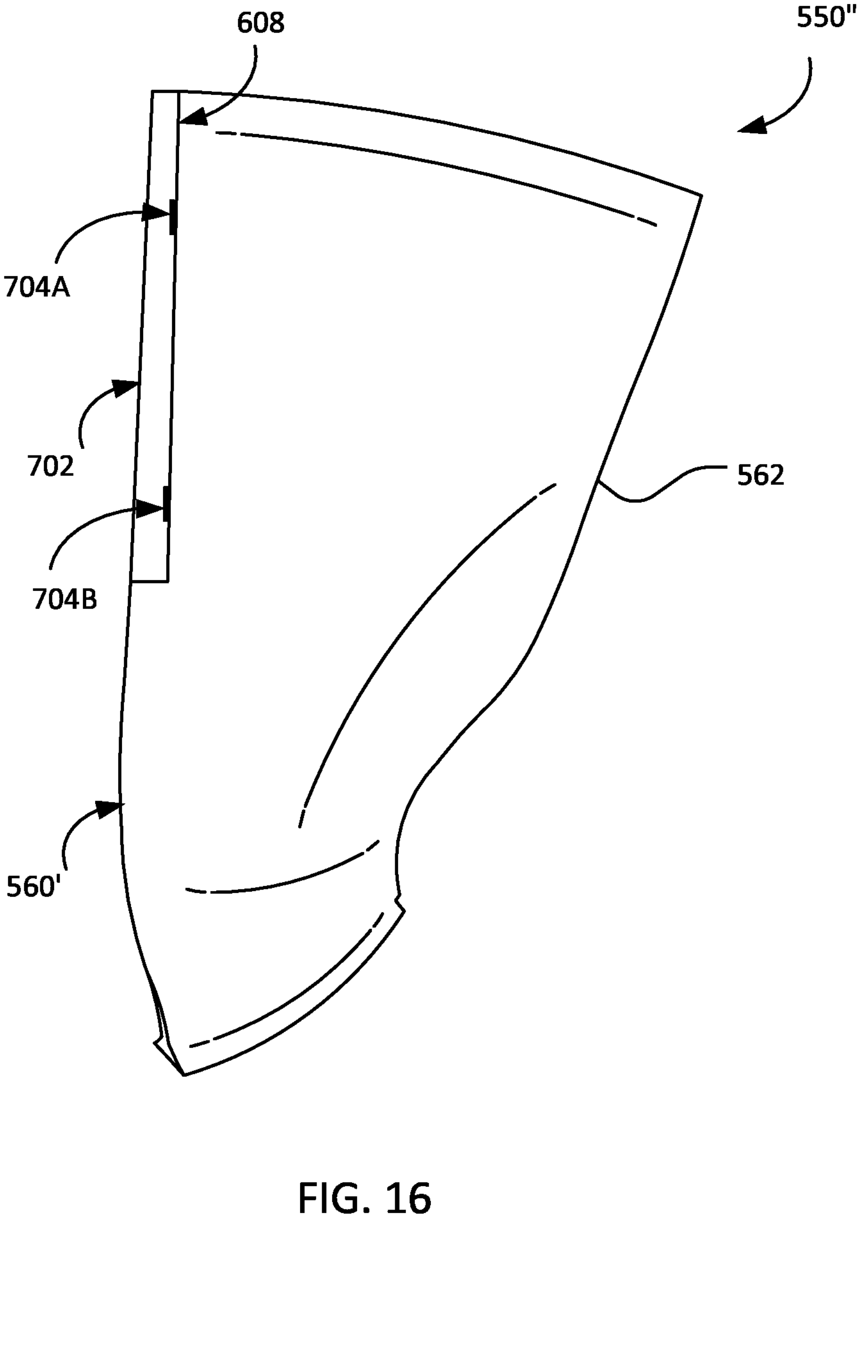
FIG. 16 is a perspective view of the hollow fan blade of FIG. 8 after the replacement portion is initially secured thereto.

FIG. 16 shows a blade 550", which may be an example of blade 550' after replacement portion 702 has been welded thereto. As can be seen in FIG. 16, replacement portion 702 may be, for example via TIG welding, welded to weld foundation 608 in only a few locations (e.g., locations 704A and 704B), as opposed to along the entire surface of replacement portion 702. Welding at locations 704A and 704B may ensure that replacement portion 702 is appropriately positioned relative to weld foundation 608 when replacement portion 702 is operably secured to weld foundation 608 via a second welding technique.

Figure 17:
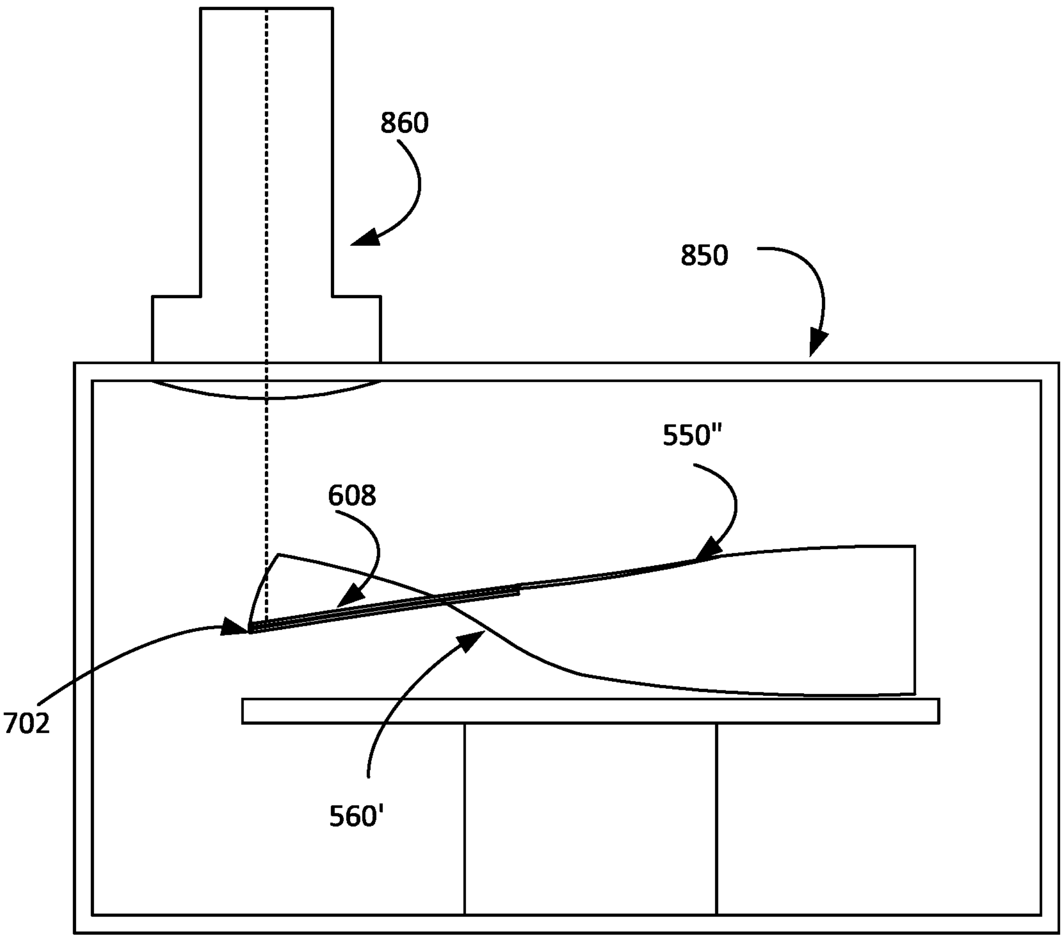
FIG. 17 is a side view of an electron beam apparatus for operably welding the replacement portion to the weld foundation.

Once replacement portion 702 has been initially secured to weld foundation 608 (e.g., but not limiting of the disclosure, via TIG welding), the hollow fan blade 550" (which now includes the replacement portion 702) may be situated in a vacuum chamber. For example, hollow fan blade 550" may be situated in vacuum chamber 850 (FIG. 17). Vacuum chamber 850 may differ from purge box 800 in that vacuum chamber 850 may be devoid of argon or another gas. Replacement portion 702 may be welded, for example by electron beam welding or another suitable welding technique, to weld foundation 608 in vacuum chamber 850 to operably secure replacement portion 702 thereto.

In certain non-limiting aspects of the disclosure, an electron beam welding apparatus 860 having an electronic beam gun may operably weld replacement portion 702 to weld foundation 608. Electron beam welding is a fusion welding process in which a beam of high-velocity electrons is applied to materials to be joined. Kinetic energy of the electrons may cause replacement portion 702 and/or weld foundation 608 to melt and flow together as the kinetic energy is transformed into heat upon impact. The greater width of replacement portion 702 relative to weld foundation 608 may provide for material that may readily be melted during welding to secure replacement portion 702 and weld foundation 608. The vacuum chamber 850 may ensure that welding conditions do not cause or allow for the dissipation of the electron beam.

Once replacement portion 702 is welded to weld foundation 608, fan blade 550" may be finished as desired to ensure that the repaired area has a smooth finish and the appropriate dimensions. Finishing the blade may involve, for example, machining the weld buildup to ensure the shape and size of the repaired blade are within required tolerances, adding a surface coating, and other such finishing processes. In certain implementations, the repaired blade may be evaluated after finishing, for example using x-ray scanning, depth profiling, fluorescent penetrant inspection, eddy current inspection, or other inspection methods now known or hereinafter developed. Additional welding may be performed if needed in view of this evaluation to ensure the repaired blade is airworthy.

Once repaired blade 550" is welded in this manner, repair may be complete and fan blade 550" may be ready for use. Using electron beam welding to secure a relatively large unibody replacement portion to the blade may ensure that defects in locations of the original leading edge, including but not limited to multiple defects at multiple locations, are addressed at the same time quickly and effectively (e.g., relative to effectuating the repair via eight or more TIG welding passes). In some aspects, another suitable welding technique may be utilized to operably secure a replacement portion to a damaged fan blade.

Figure 18A:
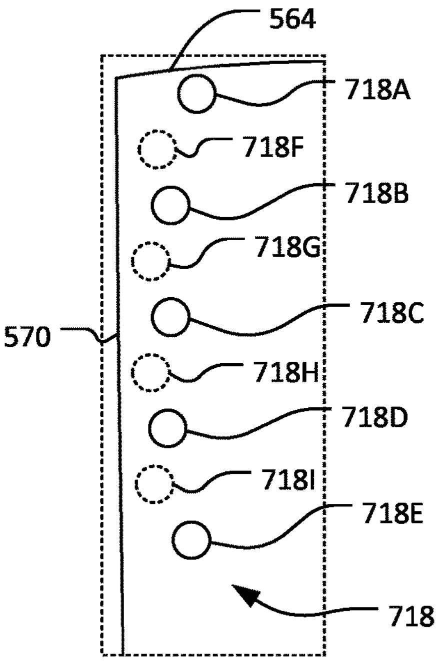
FIG. 18A is a perspective view of a section of the damaged blade with thermocouples arranged thereon for monitoring temperature.

In some aspects of the disclosure, thermocouples 718 (e.g., thermocouples 718A-718F shown in FIG. 18A) may be disposed at or about braze joint 570 prior to welding to monitor temperature at braze joint 570 and ensure braze joint 570 and fan blade 550 does not reach or exceed the distortion temperature. One or more thermocouples 718 may be secured to suction side shell 566 and one or more thermocouples 718 may be secured to pressure side shell 568. For example, in the illustrated embodiment, thermocouples 718A-718E are disposed on suction side shell 566 and thermocouples 718F-718I are located on pressure side shell 568. Temperature of thermocouples 718A-718I may be monitored during the weld repair process (e.g., while the blade 550 is in the purge box 800 and/or the vacuum chamber 850). If any thermocouple 718A-718I indicates that the temperature is approaching the distortion temperature, the welding process may be halted or otherwise modified to prevent breakage of joint 570.

Figure 18B:
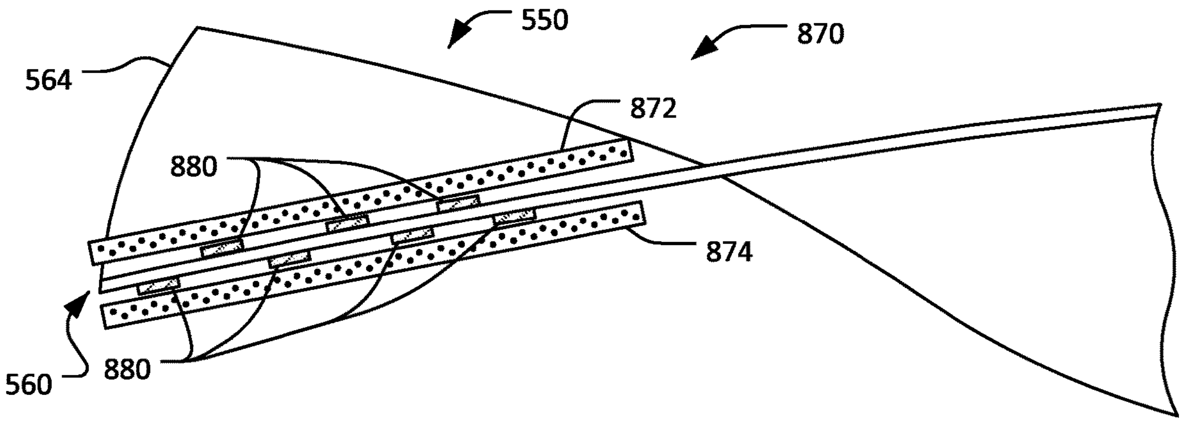
FIG. 18B shows a side view of the damaged blade of FIG. 8 with gas pads and cooling systems.

In some aspects of the disclosure, gas pads 870 may be employed to facilitate the weld repair process (see FIG. 18B). Gas pads 870 may include a gas pad 872 and a gas pad 874. Gas pad 872 may be situated on convex shell 566 proximate weld foundation 608 and gas pad 874 may be situated on concave shell 568 proximate weld foundation 608. Gas pads 872 and 874 may disperse inert gas local to the weld material and eliminate or minimize any oxidation of blade 550.

In an implementation, one or more chilling or cooling systems 880 may be arranged along or proximate leading edge 560. These cooling systems 880 may include, for example, copper chill blocks and/or water-cooled blocks which may serve to bring down temperature of fan blade 550 during welding. Cooling systems 880 may help ensure that braze joint 570 does not approach distortion temperature during the welding repair process.

Figure 19:
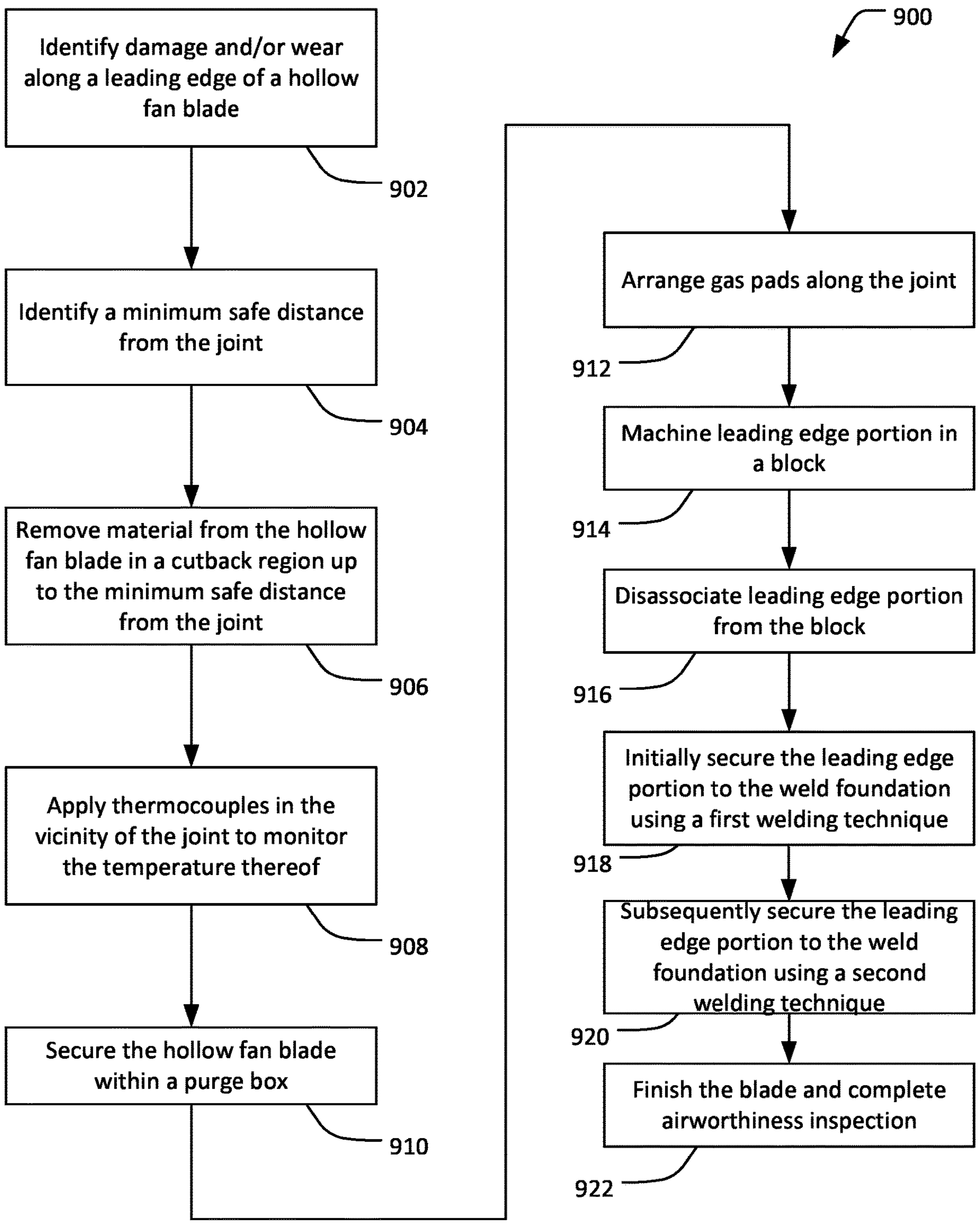
FIG. 19 is a flowchart illustrating an example method of repairing a hollow fan blade of FIG. 8.

FIG. 19 is a flow chart outlining an example method 900 to repair hollow fan blade 550. At step 902, the portion of leading edge 560 that has incurred damage may be identified. The damage may include, but is not limited to, nicks, scratches, pits, or other damage. At step 904, a minimum safe distance from the braze joint (e.g., minimum safe distance 602 from bond line or joint 570) may be identified for the particular blade being repaired. A minimum safe distance may be a distance from the braze joint at which a welding repair may be performed without causing the braze joint to reach or exceed the distortion temperature of the blade's material.

At step 906, a region of the leading edge of the blade within a cutback region may be removed to yield a weld foundation. Cutback region 604 may be outboard the braze joint 570, as such, may not enter the hollow interior of fan blade 550. Specifically, the weld foundation may be spaced apart from braze joint at least by minimum safe distance 602. Weld foundation 608 may be machined (e.g., smoothed) to ensure a smooth surface for accepting the replacement portion. A length of the weld foundation may be between about 20% and about 80% of a length of leading edge 560 of blade 550.

At step 908, a plurality of thermocouples may be arranged along braze joint 570 associated with the damaged portion of the blade. The thermocouples may be temporarily affixed, using spot welding or adhesive for example, as discussed above with reference to FIG. 18A. The thermocouples may allow for the temperature of the fan blade proximate bond line 570 to be monitored during the repair process, to ensure the temperature of bond line 570 does not reach the distortion temperature.

At step 910, the hollow fan blade may be secured within a purge box (e.g., may be fixed to mount 804 of purge box 800) to reduce the chance that oxidation of the fan blade will occur during the weld repair process. At step 912, gas pads and/or other cooling features may be located along the bond line of the blade portion being repaired, as discussed above with reference to FIG. 18B.

At step 914, a replacement portion 702 may be machined in a preform 700. Preform 700, in certain aspects of the disclosure, may have a unitary construction (i.e., may be a unibody piece) and may be made of the same metal or metal alloys as the hollow fan blade being repaired. At step 916, replacement portion 702 may be disassociated from preform 700.

At step 918, replacement portion 702 may be initially secured to weld foundation 608 using a first welding technique. In aspects, replacement portion 702 may be spot welded (e.g., but not limited to using TIG welding) to weld foundation 608 in a purge box 800. In some non-limiting examples, replacement portion 702 may have a width greater than a width of weld foundation 608, and replacement portion 702 may be laterally centered with respect to weld foundation 608 and spot welded to weld foundation 608. This position provide for extra material on either side of weld foundation 608 that may be usable to securely weld replacement portion 702 to weld foundation 608.

At step 920, replacement portion 702 may be operably secured to weld foundation 608 using a subsequent (or second) welding technique. For example, and not limiting of the embodiments, replacement portion 702 may be electron bean welded to weld foundation 608 in a vacuum chamber 850. At step 922, the repaired blade may be finished (e.g., machined as needed). The repaired blade may be evaluated to ensure suitability of repair. In implementations, the repaired blade may be evaluated using x-ray scanning, depth profiling, fluorescent penetrant inspection, eddy current inspection, etc.

As embodied by the disclosure, method 900 may be modified, performed in a different order, added to, and/or omitted as desired, and that such considerations have been contemplated and are within the scope of the disclosure. For example, forming a unibody replacement portion from a unitary preform may occur prior to the cutback region being removed from the fan blade.

Many different arrangements of the various components depicted, as well as components not shown, are possible without departing from the spirit and scope of the present disclosure. Embodiments of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Not all steps described herein and/or listed in the various figures need be carried out or need to be carried out in the specific order described.

The invention claimed is:

1. A method of repairing a hollow fan blade, the hollow fan blade including a first portion and a second portion secured together by a joint, an interior cavity of the hollow fan blade being under a vacuum, the method comprising:
  - obtaining a replacement portion, the replacement portion having a unitary construction;
  - removing a portion from a cutback region of the hollow fan blade to form a weld foundation; and
  - welding the replacement portion to the weld foundation;
  - wherein, the welding is at a temperature at the joint that does not exceed a distortion temperature of the joint, the distortion temperature of the joint being a temperature at which the joint distorts to cause the vacuum to discharge.

2. The method of claim 1, wherein welding the replacement portion to the weld foundation includes first welding the replacement portion to the weld foundation using a first welding technique and subsequently operably welding the replacement portion to the weld foundation using a second welding technique.

3. The method of claim 2, wherein the first welding technique includes tungsten inert gas (TIG) welding.

4. The method of claim 3, wherein the second welding technique includes electron beam welding.

5. The method of claim 1, wherein a width of the replacement portion is greater than a width of the weld foundation.

6. The method of claim 1, further including arranging a thermocouple on at least one of the first portion and the second portion.

7. The method of claim 1, including monitoring a temperature of at least a portion of the hollow fan blade during the welding.

8. The method of claim 1, including securing the hollow fan blade within a purge box prior to the welding.

9. The method of claim 1, wherein welding the replacement portion includes situating the hollow fan blade in a purge box and situating the hollow fan blade in a vacuum chamber.

10. The method of claim 1, wherein a length of the replacement portion is at least 20% of a length of a leading edge of the hollow fan blade.

11. The method of claim 1, wherein the interior cavity further includes a honeycomb structure.

12. The method of claim 1, including applying a finishing process after the welding, wherein the finishing process includes at least one of machining the welded material and applying a surface coating.

13. The method of claim 1, wherein the joint includes a braze joint.

14. A system for repairing a leading edge of a hollow fan blade, the hollow fan blade including a first portion and a second portion secured together by a joint, an interior cavity of the hollow fan blade being under a vacuum, the system comprising:
  - a purge box having a mount for securing the hollow fan blade during a first welding step;
  - a vacuum chamber for retaining the hollow fan blade during a second welding step under a vacuum; and
  - a temperature monitoring device configured to monitor a temperature at the joint during each of the first welding step and the second welding step relative to a distortion temperature of the joint, the distortion temperature of the joint being a temperature at which the joint distorts to cause the vacuum to discharge;
  - wherein, the first welding step is different from the second welding step.

15. The system of claim 14, including an electron beam welding apparatus.

16. The system of claim 15, wherein the temperature monitoring device is disposed on the hollow fan blade during at least the first welding step.

17. A method of repairing a hollow component, the hollow component having at least two portions secured to each other by a joint and a cavity disposed between the at least two portions, the cavity being under a vacuum, the method comprising:
  - removing a damaged section of the hollow component;
  - obtaining a replacement portion, the replacement portion being of unitary construction;
  - initially securing the replacement portion to the hollow component; and
  - securing the replacement portion to the hollow component after the replacement portion is initially secured to the hollow component;
  - wherein, a temperature at the joint during each of the initial securing and the subsequent securing of the replacement portion does not exceed a distortion temperature of the joint, the distortion temperature of the joint being a temperature at which the joint distorts to cause the vacuum to discharge.

18. The method of claim 17, wherein the hollow component is a fan blade.

19. The method of claim 17, wherein securing the replacement portion to the hollow component after the replacement portion is initially secured to the hollow component includes electron beam welding the replacement portion to the hollow component.

20. The method of claim 17, wherein initially securing the replacement portion to the hollow component includes tungsten inert gas (TIG) welding the replacement portion to the hollow component.

* * * * *